US012720319B2

(12) United States Patent
Desai et al.

(10) Patent No.: US 12,720,319 B2
(45) Date of Patent: Aug. 25, 2026

(54) N-TO-N PROTOCOL DATA UNIT ACKNOWLEDGMENT MECHANISM FOR IMPROVING INTERCEPTION DATA RELIABILITY

(71) Applicant: Microsoft Technology Licensing, LLC, Redmond, WA (US)

(72) Inventors: Shantanu Desai, Bangalore (IN); Kantha Rao Dammalapati, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 363 days.

(21) Appl. No.: 18/458,029

(22) Filed: Aug. 29, 2023

(65) Prior Publication Data

US 2025/0080990 A1 Mar. 6, 2025

(51) Int. Cl.

*H04L 5/00* (2006.01)
*H04L 1/1607* (2023.01)
*H04W 12/80* (2021.01)

(52) U.S. Cl.

CPC ........... *H04W 12/80* (2021.01); *H04L 1/1642* (2013.01); *H04L 5/0053* (2013.01)

(58) Field of Classification Search

CPC ............. H04W 12/80; H04L 1/16; H04L 5/00
See application file for complete search history.

(56) References Cited

U.S. PATENT DOCUMENTS

2009/0268683 A1* 10/2009 Ho ........................ H04L 1/1628 370/329
2023/0164573 A1* 5/2023 Surana .................. H04W 12/80 455/414.1
2024/0381098 A1* 11/2024 Celozzi ................. H04L 63/306
2025/0386199 A1* 12/2025 Attanasio ............. H04W 12/80

* cited by examiner

*Primary Examiner* — Michael T Vu

(74) *Attorney, Agent, or Firm* — Ray Quinney & Nebeker P.C.; James Bullough

(57) ABSTRACT

The present disclosure relates to a packet data units (PDU) reliability system that improves lawful interception (LI) network functions in a cloud computing system for a telecommunications network. The PDU reliability system utilizes new components and elements within the network functions of the telecommunications network to improve the reliability and robustness of transmitted PDUs. These components include PDU acknowledgment packets, sequence number lists, and PDU receipt timers. For instance, the PDU reliability system utilizes a mediation and delivery function (MDF) to generate PDU acknowledgment packets based on PDUs received from a point of interception (POI) application to indicate which PDUs have been successfully received during PDU receipt timers. Based on the PDU acknowledgment packets, the PDU reliability system causes the POI application to perform one or more PDU actions to ensure the robust and reliable transmission of the PDUs.

20 Claims, 8 Drawing Sheets

PDU Types 400

| Value 402 | Meaning 404 |
|---|---|
| 1 | X2 PDU |
| 2 | X3 PDU |
| 3 | Keepalive |
| 4 | Keepalive Acknowledgement |
| 5 | PDU ACK 406 |

FIG. 4A

PDU ACK Packet 410

412 414

| Version | 1 |
|---|---|
| PDU Type 416 | 5 |
| Header Length | <Header Length Size> |
| Payload Length | 16 |
| Payload Format 418 | 17 |
| Payload Direction | 5 |
| XID | <Interception Identifier> |
| Correlation ID | 0 |
| Conditional Attribute Fields | <Conditional Attributes> |
| Payload 420 | 1, 2, 3 |

FIG. 4B

N-TO-N PROTOCOL DATA UNIT ACKNOWLEDGMENT MECHANISM FOR IMPROVING INTERCEPTION DATA RELIABILITY

BACKGROUND

Cellular networks provide mobile devices and other computing devices with access to services from data networks. Cellular networks are part of telecommunications networks and include a radio access network (RAN), an edge network, and a core network. For example, the RAN includes base stations with communication components that interact with components of a core network and/or a cloud computing system. The core network typically includes several network functions that provide coverage and services to end-user devices and other computing devices.

One of the functions provided by cellular networks includes Lawful Interception (LI), which involves the authorized monitoring of communication services for investigation and public safety purposes. Cellular networks often provide interception functionalities for LI through network functions and microservices. For example, a sub-function called point of interception (POI) delivers packet data units (PDUs) related to intercepted data to a mediation and delivery function (MDF), which then provides the intercepted data to law enforcement agencies or government entities. However, existing systems lack mechanisms to confirm whether the PDUs have reliably reached the MDF. These existing systems are unable to determine if PDUs sent to the MDF have been dropped or lost before arriving at the MDF.

These and other problems related to managing network function resources across core networks of telecommunications networks are discussed further below.

BRIEF DESCRIPTION OF THE DRAWINGS

The detailed description provides one or more implementations with additional specificity and detail through the use of the accompanying drawings, as briefly described below. Each of the listed figures provides examples according to one or more implementations disclosed in this document.

FIGS. 4A-4B illustrate example tables of PDU types and a PDU acknowledgment packet.

DETAILED DESCRIPTION

Figure 1:
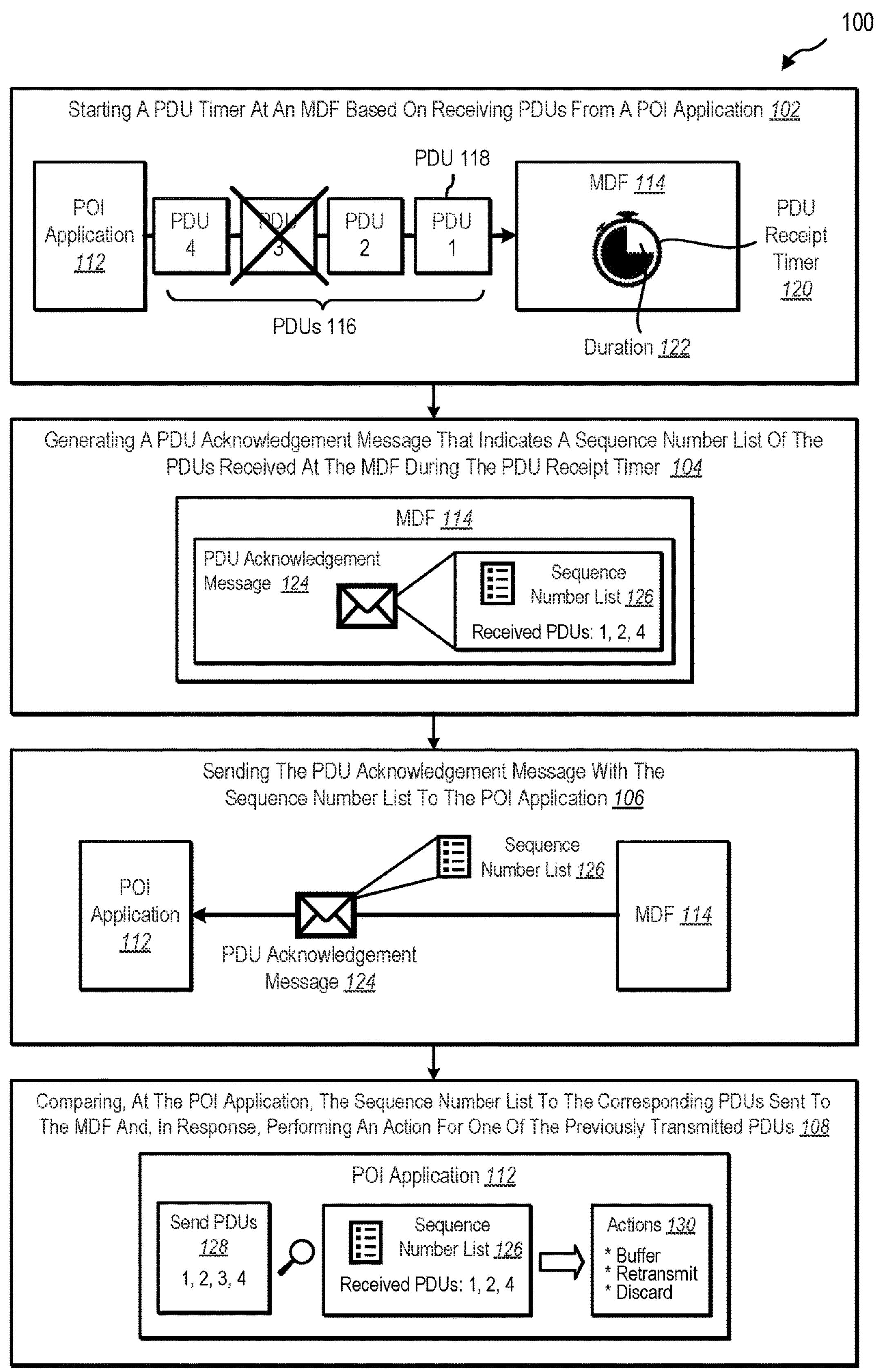
FIG. 1 illustrates an example overview of implementing a PDU reliability system to verify that packet data units (PDUs) are reliably transmitted from a point of interception (POI) application to a mediation and delivery function (MDF) based on PDU acknowledgment packets.

The present disclosure describes a packet data unit reliability system for improving the reliability and robustness of packet data units (PDUs) in a cloud computing system for a telecommunications network, specifically in the context of lawful interception (LI) network functions. The PDU reliability system utilizes various components and elements within the network functions to improve the transmission of PDUs. These components include PDU acknowledgment packets, sequence number lists, and PDU receipt timers. Additionally, the PDU reliability system utilizes a mediation and delivery function (MDF) to generate PDU acknowledgment packets based on PDUs received from a point of interception (POI) application. These PDU acknowledgment packets are n-to-n PDU acknowledgments that indicate which PDUs have been successfully received during PDU receipt timers. Based on the PDU acknowledgment packets, the PDU reliability system causes the POI application to perform one or more PDU actions, ensuring robust and reliable transmission of the PDUs.

Lawful Interception (LI) plays an important role in enabling law enforcement agencies and government entities to legally intercept and monitor communication services for investigation and maintaining public safety. Various network functions and microservices enable LI functionalities within telecommunications networks, allowing for a modular and scalable system. Additionally, standards, such as Technical Specifications from the ETSI Technical Committee for Lawful Interception (e.g., ETSI TS 103 221-2) define an electronic interface for the transmission of intercepted information as part of Lawful Interception. However, despite the current state of LI and the transmission of intercepted information, existing systems suffer from various shortcomings that are addressed by the PDU reliability system.

To illustrate, in various implementations, the PDU reliability system starts or initiates a PDU receipt timer at the MDF upon establishing a connection with a POI application or upon receiving a PDU from the POI application. As PDUs from the POI application arrive at the MDF, the PDU reliability system identifies the corresponding sequence numbers and generates a sequence number list until the PDU receipt timer expires. Subsequently, the PDU reliability system sends a PDU acknowledgment packet that includes the sequence number list to the POI application. The POI application utilizes this information to determine whether all the PDUs were successfully transmitted.

In some implementations, the POI application sends a set of PDUs to the MDF, with each PDU in the set sequentially numbered. (e.g., from 1 to $2^{32}-1$ before repeating values using 0 otherwise). In response, the MDF sends a PDU acknowledgment packet that includes a sequence number list indicating which PDUs were successfully transmitted during a PDU receipt timer. Based on the PDU acknowledgment packet, the POI application determines one or more actions to perform with a PDU from the set of PDUs by comparing the sequence number list with the sequence numbers of the PDUs sent to the MDF. For example, the POI application may buffer, retransmit, store, discard, flag, and/or log one or more PDUs from the set.

This disclosure relates to systems, methods, and computer-readable media for managing LI network functions in a telecommunications network. Specifically, it provides examples and implementations of a PDU reliability system that determines when PDUs have been reliably transmitted and implements robust actions based on the determination. In various instances, the PDU reliability system performs these actions by introducing additional components and elements. Thus, the PDU reliability system may operate features and functionalities within a core network.

The PDU reliability system described in this document provides several technical benefits in terms of computing efficiency, accuracy, and flexibility compared to conventional systems. The PDU reliability system also delivers several practical applications that solve problems associated with improving the LI network functions in a telecommunications network. Some of these benefits are discussed next while others are discussed further below.

To illustrate, the PDU reliability system utilizes PDU acknowledgment packets to indicate which PDUs sent by a POI application have been successfully transmitted to the MDF. By utilizing PDU acknowledgment packets, the PDU reliability system provides accurate and precise confirmation of each particular PDU that was successfully transmitted to the MDF. For instance, the PDU acknowledgment packets include a sequence number list that lists the sequence numbers of each received PDU at the MDF.

Additionally, utilizing PDU acknowledgment packets allows a POI application to efficiently and flexibly determine how to process transmitted PDUs. For example, the POI application may temporarily store transmitted PDUs in a buffer until it receives a PDU acknowledgment packet confirming successful transmission. Without the PDU acknowledgment packets, the POI application may need to store and retrieve PDUs from longer-term storage, which requires additional processing and memory resources.

Further, utilizing PDU acknowledgment packets allows a POI application to efficiently and accurately discover when one or more PDUs were lost or dropped before reaching the MDF. For instance, if a PDU is dropped or lost, the POI application quickly isolates the lost PDU and determines additional actions. In this way, the POI application can determine how to address the transmission error. Otherwise, as in existing systems, the POI application may remain unaware that one or more PDUs were lost as the MDF continues to respond to its availability via keepalive messages.

As mentioned, based on determining a lost PDU from the PDU acknowledgment packet, the POI application can quickly determine when a particular PDU was not successfully transmitted. Then, based on the context and type of the PDU, the POI application can determine to perform one or more actions, such as retransmitting the lost PDU. In these instances, the PDU reliability system quickly, efficiently, and accurately provides lost PDUs to MDFs for further processing. In other instances, the PDU reliability system determines that the lost PDU is no longer important to the MDF and determines to discard the lost PDU.

In various implementations, the PDU acknowledgment packet utilizes a new PDU type. The new PDU type is added to other PDU types, such as X2 PDU, X3 PDU, Keepalive, and Keepalive Acknowledgment. By adding a new PDU, the PDU reliability system allows for clear and consistent transmissions of PDU acknowledgment packets from MDFs to POI applications. In many instances, the PDU acknowledgment packet is an n-to-n PDU acknowledgment packet that provides acknowledgments for multiple PDUs sent from the POI application.

In addition, the PDU reliability system provides a PDU receipt timer at the MDF in connection with identifying received PDUs. In various implementations, the PDU receipt timer allows the MDF to routinely report received PDUs to the POI application so that lost PDUs are quickly detected and acted upon. Otherwise, the MDF may later determine that a PDU was lost when a processing error occurs, at which time the POI application may have already discarded the lost PDU and is not able to resend it.

As illustrated in the foregoing discussion, the present disclosure utilizes a variety of terms to describe the features and advantages of a PDU reliability system within a variety of computing environments. Additional details will now be provided regarding the meaning of some of these terms.

For example, the term "cloud computing system" refers to a network of interconnected computing devices that provide various services to computing devices (e.g., customer devices). For example, a cloud computing system includes a collection of physical server devices (e.g., server nodes) organized in a hierarchical structure that includes clusters, computing zones, virtual local area networks (VLANs), racks, fault domains, etc. In one or more implementations, a portion of the cellular network (e.g., a core network) may be implemented entirely or partially on a cloud computing system. Additionally, a data network may be implemented on the same or a different cloud computing network as the portion of the cellular network.

As another example, the term "telecommunications network" refers to a system of interconnected devices distributed over geographical areas that provide communication and data capabilities to end-user devices (e.g., mobile and non-mobile devices). In one or more implementations described herein, a telecommunications network refers to a cellular network that includes radio access network (RAN) components, core network components, and network functions implemented on server nodes in the cellular network. In particular, in one or more implementations described herein, the telecommunications network refers specifically to a fifth-generation (5G) network environment. However, other implementations may include previous generations (e.g., 2G, 3G, 4G) or future generations (6G and beyond) that utilize network functions implemented on computing devices in the telecommunications network.

As used herein, a "network function" refers to an entity in a telecommunications network that provides access to one or more services or applications of the telecommunications network. A network function may refer to a wide variety of network function types corresponding to different unique or defined functions or services that may be provided via the telecommunications network. Examples of network functions include physical functions, virtual network functions, or any of the various types of network functions. Examples of network functions include, but are not limited to, session management functions (SMFs), user plane functions (UPFs), access and mobility management functions (AMFs), and any other type of function that can be implemented within a telecommunications network. In one or more implementations, a network function may refer to any function or entity in a telecommunications network (e.g., 2G, 3G, 4G, 5G, or beyond cellular environment) that provides access to a service and/or application to a client of the telecommunications network.

As mentioned above, the term "lawful Interception" (LI) refers to the legally authorized interception and monitoring of communication services by law enforcement agencies, government entities, or other individual or organization authorized to intercept and/or monitor communications for investigation and maintaining public safety. In various implementations, LI network functions and LI microservices refer to the implementation of lawful interception functionalities within the architecture of a mobile core network and/or cloud computing system.

As used herein, the term "protocol data unit" (PDU) refers to a unit of data that is encapsulated and transmitted as a single entity within a communication protocol via telecommunications and computer networks. A PDU includes various PDU types, such as X2 PDU, X3 PDU, Keepalive, and Keepalive Acknowledgment. In various instances, X2 PDU refers to exchanging intercept-related information (xIRI) between network functions, including data regarding handover management, load balancing, interference management, and/or other user control plane based-data. X3 PDU refers to exchanging content of communication (xCC) between network functions, such as content-based data. Keepalive refers to network protocols to maintain the presence and availability of a network device or connection. Keepalive PDUs are periodically sent between communicating entities (e.g., from a POI application to an MDF) to indicate that they are still active and reachable. The receipt of a Keepalive Acknowledgment confirms the continued availability of the recipient (e.g., the MDF).

As used herein, a "point of interception application" (POI application) refers to a software application or component for intercepting and capturing network traffic at a designated point within a communication network. It is a specialized application that operates within the context of LI systems. Often, the POI application is a sub-function within a network function within the mobile core network of the telecommunications system. In many instances, a POI application collects and forwards intercepted communication data to a mediation and delivery function (MDF).

As used herein, a "mediation and delivery function" (MDF) refers to a component within the LI framework that acts as an interface between different network elements and protocols. The MDF is a network function that facilitates functions such as protocol conversion, data transformation, routing, and delivery of communication services. In one or more embodiments described herein, the MDF helps bridge the gap between different network components, thus enabling seamless communication and interoperability within the network infrastructure.

As used herein, the term "PDU receipt timer" refers to a timer that the MDF utilizes while receiving PDUs (or expecting to receive PDUs) from a POI application. The PDU receipt timer includes a duration (e.g., a first duration) that is predetermined for the PDU and, as will be discussed herein, may be determined or configured to run a particular duration of time based on a variety of factors. In some examples described herein, the PDU receipt timer starts or is otherwise initiated and decreases or otherwise decrements until the PDU receipt timer expires. For PDUs received at the MDF during the duration of a PDU receipt timer, sequence numbers of the received PDU are identified. As used herein, the term "sequence number list" refers to a list of sequence numbers indicating the sequence numbers of PDUs that arrived at the MDF during a PDU receipt timer. If no PDUs arrive, a sequence number list can include a default value, such as 0, indicating no PDUs arrived in the PDU receipt timer interval.

As used herein, the term "PDU acknowledgment packet" refers to a PDU packet (or message) that includes the sequence number list. The MDF sends a PDU acknowledgment packet to the corresponding POI application each time a sequence number list is generated based on a PDU receipt timer running and expiring. The PDU acknowledgment packet is an n-to-n PDU acknowledgment packet that provides acknowledgments for multiple PDUs sent from the POI application. This way, each MDF sends a PDU acknowledgment packet for a group or set of received PDUs back to the POI application, which enables the POI application to track the delivery status of each PDU. In various instances, a PDU acknowledgment packet indicates a new PDU type to signal that the packet is a PDU acknowledgment packet.

As used herein, an "action" with PDUs refers to a POI application performing an action with one or more PDUs from a set of transmitted PDUs (e.g., PDUs previously transmitted from the POI application to the MDF). As provided below, the POI application performs one or more actions based on using a sequence number list in a PDU acknowledgment packet to determine which PDUs in a set of transmitted PDUs were successfully transmitted to the MDF.

Additional details regarding an example implementation of the PDU reliability system are discussed in connection with the following figures. For example, FIG. 1 illustrates an example overview of implementing a PDU reliability system to verify that packet data units (PDUs) are reliably transmitted from a point of interception (POI) application to a mediation and delivery function (MDF) based on PDU acknowledgment packets according to one or more implementations. As shown, FIG. 1 includes a series of acts 100 where the acts are performed by a PDU reliability system in many instances.

To illustrate, the series of acts 100 includes an act 102 of starting or otherwise initiating a PDU receipt timer at an MDF based on receiving PDUs from a POI application. When a POI application 112 obtains interception information, the POI application 112 sends PDUs to an MDF 114 within a mobile core network before providing the information to an LI system. The POI application 112 sends PDUs 116 to the MDF 114 as a set where each PDU is sequentially numbered. Upon the MDF 114 establishing a connection with or receiving a PDU 118 from the POI application 112 (e.g., receiving the first PDU in the set), the PDU reliability system starts a PDU receipt timer 120 at the MDF 114, where the timer has a duration 122.

As shown, the series of acts 100 includes an act 104 of generating a PDU acknowledgment packet that indicates a sequence number list of the PDUs received at the MDF during the PDU receipt timer. During the duration of the PDU receipt timer 120, the PDU reliability system identifies the sequence numbers of PDUs that arrive at the MDF 114. Then, when the duration 122 of the PDU receipt timer 120 expires, the PDU reliability system generates a sequence number list 126 that indicates each of the identified sequence numbers for PDUs received during the duration 122 of the PDU receipt timer 120.

When each PDU in the set sent by the POI application 112 is received at the MDF 114, the sequence number list 126 includes all of the corresponding sequence numbers. In some instances, one or more of the PDUs 116 from the set is dropped or lost during transmission. As a result, the sequence numbers for these PDUs are not included in the sequence number list generated at the MDF 114. For example, as shown in FIG. 1, PDU 3 from the PDUs 116 is lost during transmission and not included or otherwise reflected in the sequence number list 126.

Additionally, the PDU reliability system generates a PDU acknowledgment packet 124 at the MDF 114 that includes the sequence number list 126. For instance, the PDU reliability system generates a PDU having a new PDU type that indicates the PDU as a PDU ACK of the recently received PDUs. The PDU acknowledgment packet 124 includes a payload of the sequence number list 126. The MDF 114 then sends the PDU acknowledgment packet 124 with the sequence number list 126 to the POI application 112, as shown in act 106.

As shown, the series of acts 100 includes an act 108 of comparing, at the POI application 112, the sequence number list 126 to the corresponding PDUs sent to the MDF 114 and, in response, performing an action for one or more of the previously transmitted PDUs. For instance, the POI application 112 receives the PDU acknowledgment packet 124 and compares the sequence number list 126 to the sequence numbers of the PDUs 116 in the sent PDUs 128 to the MDF 114. Based on the comparison, the POI application 112 determines whether all of the sent PDUs 128 were successfully transmitted or whether some of them were dropped.

Based on the result of the comparison, the POI application 112 performs various actions 130. For example, if the POI application 112 determines that all of the sent PDUs 128 were successfully transmitted, it may perform a first set of actions, such as removing the sent PDUs 128 from a local buffer. If the POI application 112 determines that a PDU was lost, it may perform a second set of actions, such as retransmitting the lost PDU or discarding it. In various instances, the POI application 112 determines which action to perform based on the context of the lost PDU, as further described below.

Figure 2:
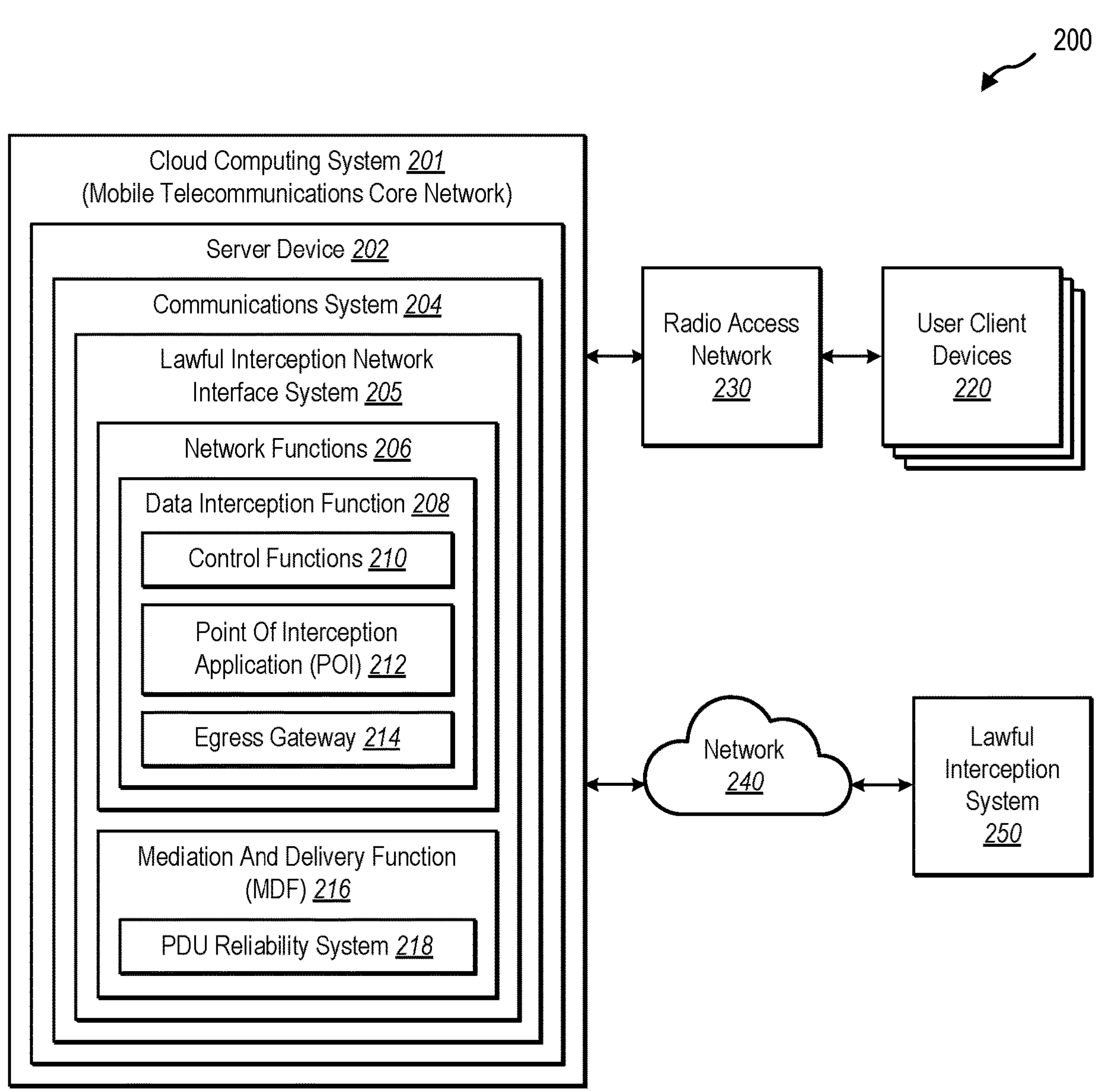
FIG. 2 illustrates an example environment that includes a PDU reliability system for managing network functions in a cloud computing system of a core network.

With a general overview of the PDU reliability system in place, this next section provides additional details about the components and elements relating to the PDU reliability system. For example, FIG. 2 illustrates an example environment that includes a PDU reliability system for managing network functions in a cloud computing system of a core network in accordance with one or more implementations. While FIG. 2 shows one example arrangement and configuration of components, other arrangements and configurations are also possible.

As shown in FIG. 2, there is a computing system environment 200 with a cloud computing system 201, a radio access network 220 (RAN), and user client devices 230, all of which are connected in electronic communication. Further details on these and other computing devices are provided below in connection with FIG. 7.

In some instances, the computing system environment 200 is a telecommunications network, such as a public or private cellular network. For example, the computing system environment 200 may be a cellular network that includes the radio access network 220, and a mobile telecommunications core network (e.g., the cloud computing system 201). Additionally, while not shown, the cloud computing system 201 is often connected to a data network (e.g., the Internet or external resources).

In some cases, the radio access network 220 is part of a cellular network, such as a 5G network, to which the user client devices 230 connect. Components of a core network (e.g., the cloud computing system 201) or the radio access network 220 may be implemented as part of an edge network, datacenter, or at various other locations, depending on the specific implementation of the computing system environment 200.

In one or more implementations, the radio access network 220 includes one or more RAN sites. In some cases, a RAN site includes one or more base stations and associated RAN components. Although the user client devices 230 may have components that are entirely separate from the core network, some implementations of the computing system environment 200 may include one or more RAN components or services traditionally offered by a RAN site that are implemented on the cloud computing system 201 (e.g., as part of a core network). For example, while FIG. 2 illustrates the user client devices 230 being entirely separate from the cloud computing system infrastructure, the computing system environment 200 may collectively provide services (e.g., physical and/or virtualized functions) that collectively make up a core network, a RAN, or other portions of a telecommunications network.

In various implementations, the user client devices 230 include a variety of computing devices and/or device endpoints such as mobile devices (e.g., mobile telephones, smartphones, personal digital assistants (PDAs), tablets, or laptops), and non-mobile devices such as desktop computers, server devices (e.g., edge network servers), or other non-portable devices. In some implementations, the user client devices 230 refer more generally to any endpoint capable of communicating with devices on the cloud computing system 201, such as Internet of Things (IoT) devices or other Internet-enabled devices. In one or more implementations, the user client devices 230 refer to applications or software constructs on corresponding computing devices.

As mentioned previously, in various implementations, the cloud computing system 201 may be a portion of a telecommunications network. For example, the cloud computing system 201 represents some or all of the core network of a telecommunications network. In some implementations, some or all of the cloud computing system 201 represents a cloud service that provides network function services.

As also shown, the computing system environment 200 includes a lawful interception system 250 connected to the cloud computing system 201 via a network 240. In various instances, the lawful interception system 250 is a server device, a client device, or another type of computing device that allows government or law enforcement agencies to lawfully receive and process interception information of the radio access network 220. In some instances, the lawful interception system 250 is connected to the cloud computing system 201 via a radio access network 220, as described above, in addition to or in place of the network 240.

As shown in FIG. 2, the cloud computing system 201 includes a server device 202 (made up of one or more server devices) with a communications system 204. In various implementations, the communications system 204 manages the exchange of information between devices, components, and services. For example, the communications system 204 provides data to and from the server device 202 to other service devices, the user client devices 230 (via the radio access network 220), or another cloud computing system.

As further shown, the server device 202 includes a lawful interception network interface system 205 within the communications system 204. In some instances, the lawful interception network interface system 205 is located outside of the communications system 204. In various implementations, the lawful interception network interface system 205 manages the lawful interception of data and information within the cloud computing system 201 between the radio access network 220 and the lawful interception system 250.

As shown, the lawful interception network interface system 205 includes network functions 206 including a data intercept function 208. Also, the data intercept function 208 includes control functions 210, a point of interception (POI) application 212, and an egress gateway 214. In various instances, the control functions 210 are sub-functions of the data intercept function 208 that accepts LI tasking messages, such as over a standardized interface (e.g., an X1 LI interface) or another unspecified interface. In some instances, the POI application 212 performs interception and is a sub-function of the data intercept function 208 that performs interception and emits data. Additionally, the data intercept function 208 may include multiple POIs, in which case, the outputs are multiplexed into a single output stream (e.g., an X2 or X3 output stream). Further, the egress gateway 214 provides outgoing traffic from the data intercept function 208 to other components, such as an MDF.

As shown, the lawful interception network interface system 205 includes network functions 206, including a mediation and delivery function (MDF) 216. In various implementations, the MDF 216 performs translations, correlations, and mediations for handing over material to an authorized agency via various interfaces (e.g., the HI2 or HI3 interfaces).

As shown, the PDU reliability system 218 is located within the MDF 216. In various implementations, the PDU reliability system 218 is located, fully or partially, on the POI application 212. In some instances, the PDU reliability system 218 is fully or partially located elsewhere, such as within the communications system 204 or lawful interception network interface system 205. Regardless of where the PDU reliability system 218 is located, it implements various functions within the lawful interception network interface system 205 to improve the reliability and robustness of sending PDUs between the POI application 212 and the egress gateway 214.

Figure 3A:
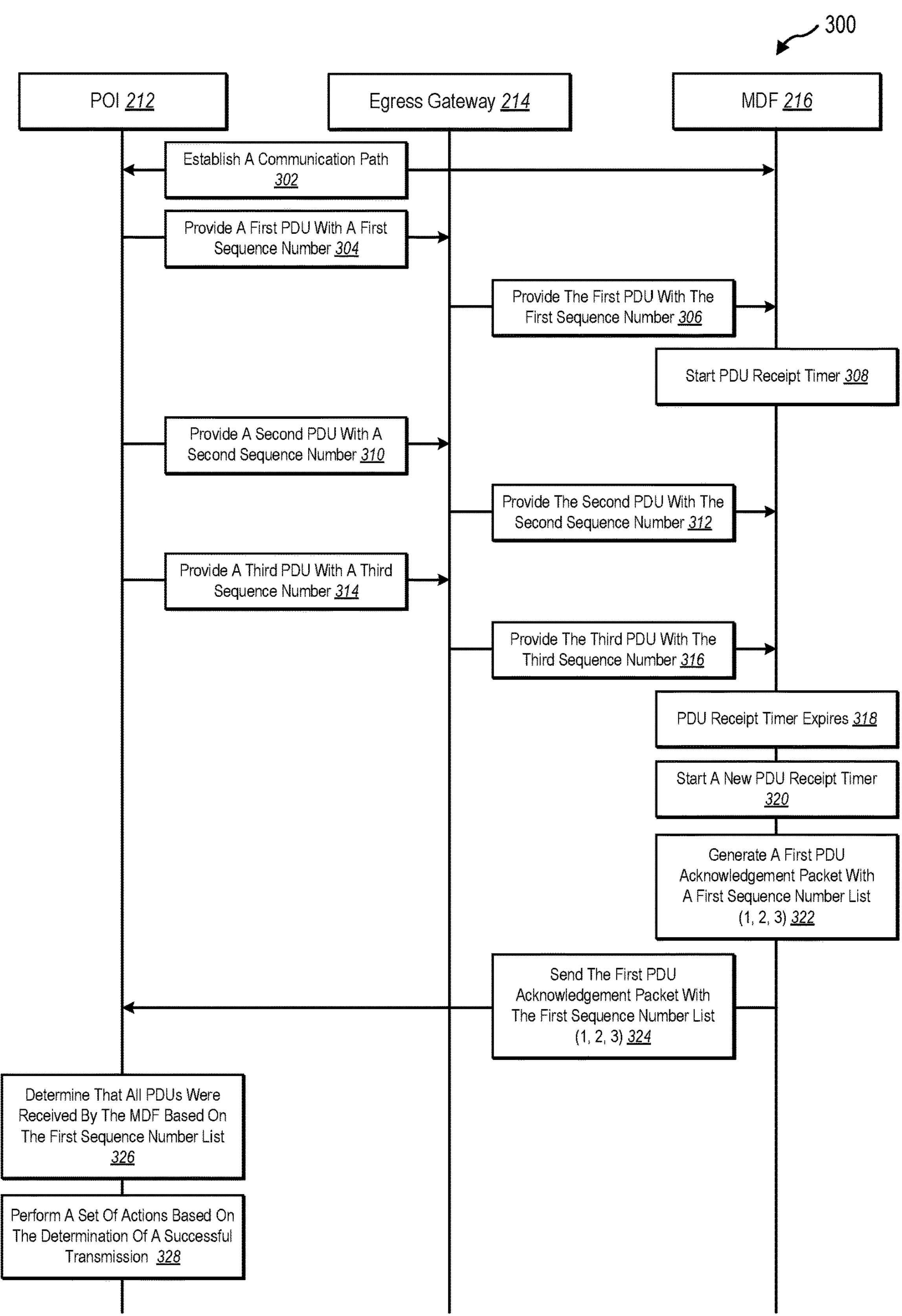
FIGS. 3A-3B illustrate implementations of example sequence flows for utilizing PDU acknowledgment packets to ensure that PDUs are successfully transmitted to the MDF.
Figure 3B:
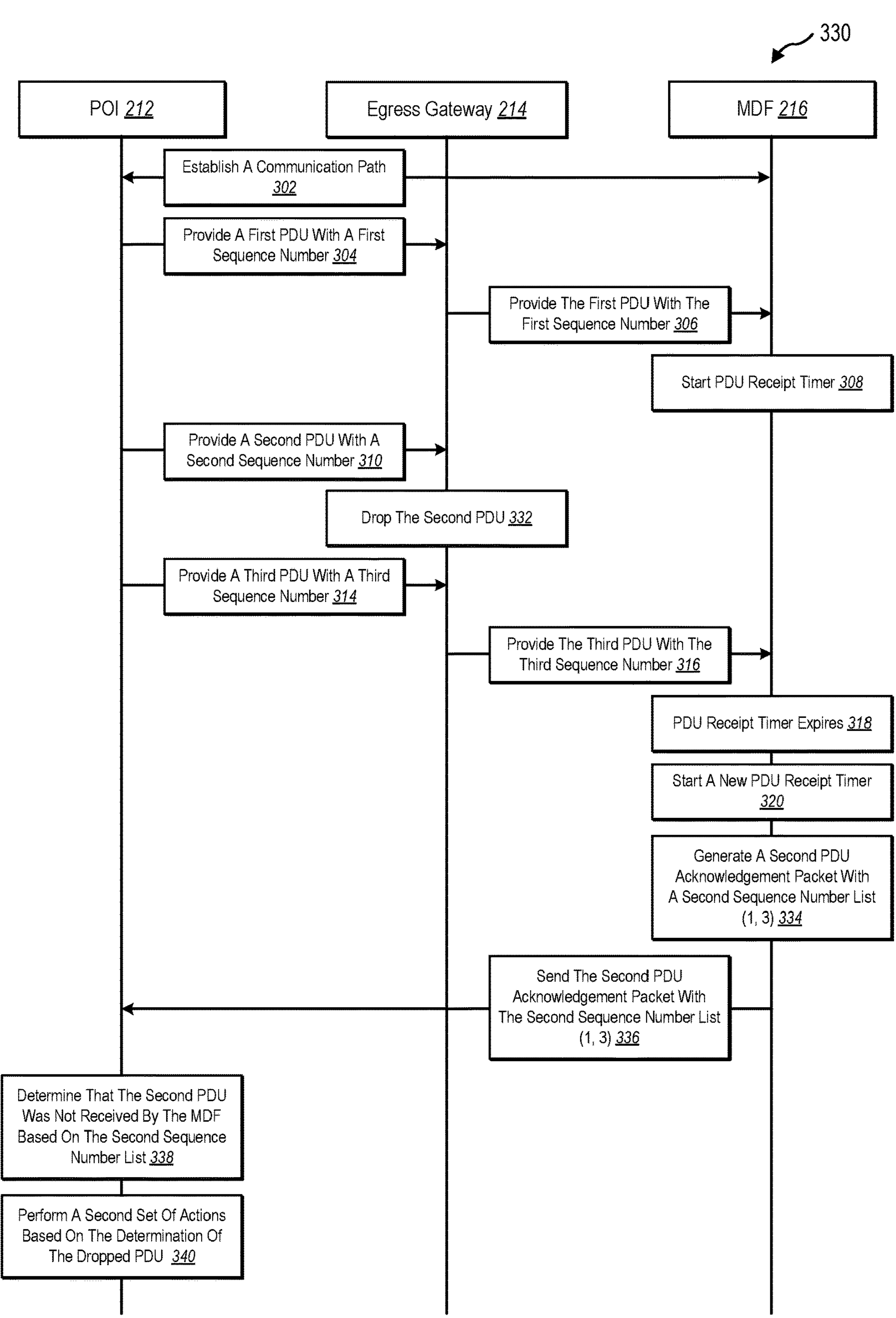

Additional information will now be provided with respect to the PDU reliability system 218 implementing network function features to improve the reliability of PDU transmissions. For example, FIGS. 3A-3B illustrate implementations of example sequence flows for utilizing PDU acknowledgment packets to ensure that PDUs are successfully transmitted to the MDF. As shown, FIGS. 3A-3B include interactions between the POI application 212, the egress gateway 214, and the MDF 216.

As mentioned before, a POI application uses a keepalive PDU type to periodically ping an MDF to ensure that the MDF is able to receive X2 PDUs and X3 PDUs. In response, the MDF sends a keepalive acknowledgment PDU to indicate its availability. In some instances, the POI application sends a keepalive PDU every 60 seconds or based on a PDU keepalive timer of another duration (e.g., a second duration). However, despite the POI application knowing that the MDF is available, with existing systems, the POI application is unaware when any PDUs are dropped, lost, or otherwise not successfully transmitted to the MDF. Accordingly, the PDU reliability system 218 improves upon existing systems to remedy this problem by utilizing various features and components, including PDU acknowledgment packets.

To illustrate one example, FIG. 3A includes a first series of acts 300 implemented by the PDU reliability system 218. The first series of acts 300 may start with the POI application 212 obtaining intercept data to pass on. For example, the first series of acts 300 includes an act 302 of the POI application 212 establishing a communication path with the MDF 216. The POI application 212 and the MDF 216 may use various protocols and/or communications to establish a communication path for sending PDUs to the MDF 216.

When obtaining intercept data, the POI application 212 provides the data to the MDF 216. For example, the POI application 212 generates a set of sequentially numbered PDUs and sends them to the MDF 216. Often, the POI application 212 utilizes the egress gateway 214 to send the packets to the MDF 216. In various implementations, the POI application 212 and the egress gateway 214 are co-located on the same network function.

To illustrate, the first series of acts 300 includes an act 304 of the POI application 212 providing a first PDU with a first sequence number to the egress gateway 214. The egress gateway 214 provides the first PDU with the first sequence number to the MDF 216, as shown in the act 306. In various implementations, the egress gateway 214 utilizes one or more TCP proxies and load balancers to route PDUs to the MDF 216.

As shown in the act 308, in response to receiving the first PDU, the PDU reliability system 218 starts the PDU receipt timer at the MDF 216. In some instances, the PDU receipt timer is started when the communication path is established. In either case, the PDU reliability system 218 starts the PDU receipt timer in connection with PDUs arriving from the POI application 212. In some instances, the PDU reliability system 218 utilizes different instances of the PDU receipt timer corresponding to different POI applications sending PDUs.

When the PDU receipt timer is running, the MDF 216 identifies incoming PDUs from the POI application 212. For instance, the MDF 216 inspects the header of a PDU to identify various identifiers including an interception transaction identifier (XID) that has a sequence number value (e.g., an intercepted identifier sequence number). Additionally, the MDF 216 may identify additional identifiers, such as a device identifier (DID), network function identifier (NFID), Internet Protocol identifier (IPID), and/or correlation identifier.

As shown, the first series of acts 300 includes the act 310 of the POI application 212 providing a second PDU with a second sequence number to the egress gateway 214. The egress gateway 214 then provides the second PDU to the MDF 216, as shown in the act 312. Additionally, the first series of acts 300 includes the act 314 of the POI application 212 providing a third PDU with a third sequence number to the egress gateway 214, which provides the third PDU to the MDF 216, as shown in the act 316.

Additionally, the first series of acts 300 includes the act 318 of the PDU receipt timer expiring at the MDF 216. The PDU receipt timer expires based on the duration of the timer elapsing. The expiration of the PDU receipt timer triggers various actions including generating a PDU acknowledgment packet and potentially starting a new PDU receipt timer, which are described below.

In various implementations, the duration of the PDU receipt timer (e.g., a first duration) matches the duration of a PDU keepalive timer (e.g., a second duration), which is commonly 60 seconds or other predetermined duration of time. In some instances, the PDU receipt timer has a short duration, such as 15, 30, or 45 seconds. In various implementations, the PDU receipt timer uses a first duration for X2 PDUs and a second, shorter duration when the MDF 216 receives X3 PDUs. For instance, the content in X2 PDUs is less time-sensitive than the content in X3 PDUs.

As mentioned above, upon the PDU receipt timer expiring, the MDF 216 performs the act 320 of starting a new PDU receipt timer. This way, the PDU reliability system 218 repeats the process of identifying and accumulating all the sequence numbers from PDUs received since the previous PDU receipt timer expiration. For each timer duration, the PDU reliability system 218 generates and sends a PDU acknowledgment packet, as described next. The PDU acknowledgment packet is an n-to-n PDU acknowledgment packet that provides acknowledgments for multiple PDUs sent from the POI application 212.

In one or more implementations, the PDU reliability system 218 causes the MDF 216 to maintain PDU receipt timers while the communication path is established. In various implementations, the PDU reliability system 218 pauses the timer if no PDUs were received during the previous PDU receipt timer. In some implementations, the PDU reliability system 218 delays starting a new PDU receipt timer until a new PDU is received.

As also mentioned above, upon the PDU receipt timer expiring, the MDF 216 performs the act 322 of generating a first PDU acknowledgment packet with a first sequence number list. As shown, the first sequence number list includes the sequence numbers 1, 2, and 3 corresponding to the first PDU, the second PDU, and the third PDU that arrives at the MDF 216 during the duration of the first PDU receipt timer. PDUs that arrive during the new PDU receipt timer are added to a new sequence number list.

In some instances, if no PDUs were received at the MDF during the duration of the PDU receipt timer, then the PDU reliability system 218 may record the sequence number list as "0", "none," a default value, or another value. When PDUs start their sequence numbers with 1, the value 0 may be reserved to indicate no received PDUs.

Additionally, the PDU reliability system 218 may store each sequence number in the sequence number list as a four-octet unsigned integer. In this manner, the PDU reliability system 218 can include values from 0 to $2^{32}-1$ before repeating values. In one or more implementations, the PDU reliability system 218 utilizes other data structures to store sequence numbers in a sequence number list.

As part of the act 322, the MDF 216 adds the first sequence number list as the payload to a first PDU acknowledgment packet. Then, as shown in the act 324, the MDF 216 sends the first PDU acknowledgment packet with the first sequence number list to the POI application 212.

As shown in the act 326, the POI application 212 determines that all PDUs were received by the MDF 216 based on the first sequence number list. For example, the POI application 212 compares the first sequence number list to a list of sent PDUs in the PDU set to determine that each of the PDUs was transmitted successfully.

Based on the determination that the PDUs arrived at the MDF 216, the POI application 212 performs a first set of actions, as shown in the act 328. The first set of actions includes discarding or removing the PDUs. For instance, the POI application 212 maintains the PDUs in a short-term buffer and removes, discards, or overwrites them upon successful transmission. In one or more implementations, the POI application 212 moves the successfully transmitted to long-term storage. In some instances, the first set of actions includes taking no additional actions regarding the transmitted PDUs but continuing to transmit additional PDUs.

While the first series of acts 300 provides an example of the PDU reliability system 218 confirming the successful transmission of PDUs, FIG. 3B provides an example of acts performed by the PDU reliability system 218 when a PDU is not successfully transmitted.

To illustrate, FIG. 3B includes a second series of acts 330 performed by the PDU reliability system. The second series of acts 330 replicates various acts from the first series of acts 300. For instance, the second series of acts 330 also includes the acts 302-308, which involve establishing a communication path, starting the PDU receipt timer at the MDF 216, and sending the first PDU from the POI application 212 to the MDF 216 via the egress gateway 214.

As shown, the second series of acts 332 also includes the act 310 of providing a second PDU with a second sequence number from the POI application 212 to the egress gateway 214. However, unlike before, the egress gateway 214 drops the second PDU. In some instances, the egress gateway 214 forwards the second PDU, but it gets dropped or lost at a proxy gateway or load balancer before reaching the MDF 216. In other instances, the MDF 216 may be temporarily unavailable to receive one or more PDUs. There may be various reasons for the second PDU not being successfully transmitted to the MDF 216.

As also shown, the second series of acts 330 includes the acts of 314-320, which include sending the third PDU to the MDF 216, having the PDU receipt timer expire, and starting a new PDU receipt timer. Indeed, the POI application 212 may send an additional or fewer PDUs to the MDF 216 during the duration of the PDU receipt timer and one or more of those PDUs may fail to successfully arrive.

The second series of acts 330 includes the act 334 of generating a second PDU acknowledgment packet at the MDF 216 with a second sequence number list. Notably, the terms first PDU acknowledgment packet/first sequence number list and second PDU acknowledgment packet/second sequence number list are used for the purpose of explanation to indicate different instances or versions rather than showing successive instances.

Because the second PDU was dropped, it was not received by the MDF 216. As a result, the MDF 216 did not include it in the second sequence number list, which only includes sequence numbers for the first PDU and the third PDU. Accordingly, the second PDU acknowledgment packet includes a payload of the second sequence number list indicating the successful transmission of the first PDU and the third PDU but no mention of the second PDU.

As shown in the act 336, the MDF 216 sends the second PDU with the second sequence number list to the POI application 212. In response, the POI application 212 determines that the second PDU was not received by the MDF 216 based on the second sequence number list. For instance, the POI application 212 compares the second sequence number list to the list of sent PDUs to determine a discrepancy between the second PDU being sent and the second PDU not being included in the second sequence number list.

In various instances, the POI application 212 utilizes multiple sequence number lists to determine that one or more PDUs have been dropped, as shown in the act 338. For example, a first sequence number list includes sequence numbers for PDUs 1-5 while the POI application has sent out PDUs 1-6 before a first PDU receipt timer expired. If the second, next sequence number list in the next PDU acknowledgment packet indicates sequence numbers for PDUs 6-10, then the POI application 212 determines the successful transmission of PDUs 1-6. However, if the second sequence number list indicates sequence numbers for PDUs 7-10, the POI application 212 determines that PDU 6 was dropped.

Upon determining a dropped PDU, the POI application 212 performs a second set of actions, as shown in the act 340. For example, the second set of actions includes retransmitting the dropped or lost PDU. For instance, the PDU is stored in a buffer and the POI application 212 resends it to the MDF 216. In some instances, the POI application 212 removes successfully transmitted PDUs from the buffer to make room for new PDUs to be transmitted. Likewise, the POI application 212 may retransmit lost PDUs while moving successfully transmitted ones to long-term memory. In various implementations, the second set of actions includes discarding and/or flagging the lost packet. In one or more implementations, the PDU reliability system 218 logs the lost packet along with any available transmission information.

If the POI application 212 retransmits a PDU, the PDU may be sent out of sequence order. For example, if the POI application 212 determines that PDU 2 was dropped after sending PDU 5, it may send PDU 2 next before PDU 6. Then, the next PDU acknowledgment packet received at the POI application 212 may indicate a sequence number list of 4, 5, 2, 6. From this, the POI application 212 determines that PDU 2 was successfully retransmitted.

In various implementations, the POI application 212 determines what type of action to perform based on the context and/or type of PDU that was unsuccessfully transmitted. For example, when a PDU is determined as lost, the POI application 212 identifies and analyzes additional identifiers of a local copy of the PDU, such as the device identifier (DID), network function identifier (NFID), Internet Protocol identifier (IPID), and/or correlation identifier, to determine the context and importance level of the PDU. Based on the context type and importance level, the POI application 212 determines which set of actions to take. For instance, the POI application 212 retransmits an important PDU of a first context type while discarding a less important PDU of a second context type.

As mentioned above, the PDU reliability system 218 utilizes PDU acknowledgment packets to efficiently and accurately determine whether PDUs are successfully transmitted to the MDF 216. Based on a PDU being successfully or unsuccessfully transmitted, the PDU reliability system 218 performs one or more actions to ensure that successfully transmitted PDUs are efficiently treated (e.g., removed, ignored, or stored) while unsuccessfully transmitted PDUs are robustly and reliably retransmitted, retrieved, logged, flagged, and/or discarded.

FIGS. 4A-4B illustrate example tables of PDU types and a PDU acknowledgment packet. To illustrate, FIG. 4A shows a PDU Types table 400 that includes values 402 of different PDU types and their corresponding meanings 404. While Values 1-4 correspond to existing PDU types, Value 5 corresponds to a new PDU type of a PDU acknowledgment packet (i.e., PDU ACK 406). As noted above, PDU acknowledgment packets include sequence number lists periodically sent from an MDF to a corresponding POI application to indicate which PDUs have been received during the duration of a PDU receipt timer. Notably, the PDU ACK 406 may be assigned to another PDU value in other instances.

In some instances, the PDU reliability system 218 provides sequence number lists to a POI application within a new PDU type. For instance, in some implementations, the PDU reliability system 218 uses the PDU keepalive timer to track incoming PDUs and generate sequence number lists (as described above in connection with the PDU receipt timer). Additionally, the PDU reliability system 218 sends the sequence number lists as a payload within the keepalive acknowledgment PDU. In one or more implementations, the PDU reliability system 218 maintains the separate PDU receipt timer but includes the generated sequence number lists within the keepalive acknowledgment PDUs.

FIG. 4B shows a PDU ACK Packet table 410 that includes fields 412 and their corresponding values 414 for a PDU acknowledgment packet. As shown, the fields 412 include various fields included in a PDU acknowledgment packet including the PDU type 416, header information, payload information, and identifier information. For example, the fields 412 include a payload format 418. When the PDU type is a particular value (shown as "5"), the POI application 212 knows that the PDU is a PDU acknowledgment packet. Additionally, when the payload format 418 is a particular value (shown as "17"), the POI application 212 knows that the payload 420 should include a sequence number list. In some instances, the payload format 418 specifies a data format or structure in which the payload 420 is written. Notably, the PDU acknowledgment packet may include fewer, additional, or different fields.

Figure 5:
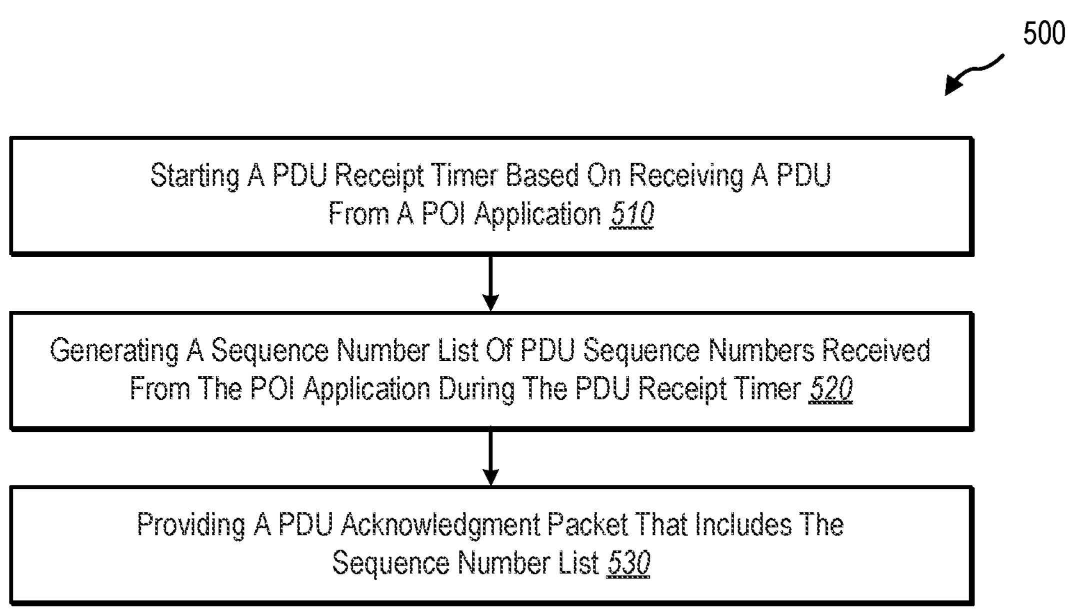
FIG. 5 illustrates an example series of acts for a computer-implemented method for improving data reliability of a lawful interception network interface within a telecommunications mobile network.
Figure 6:
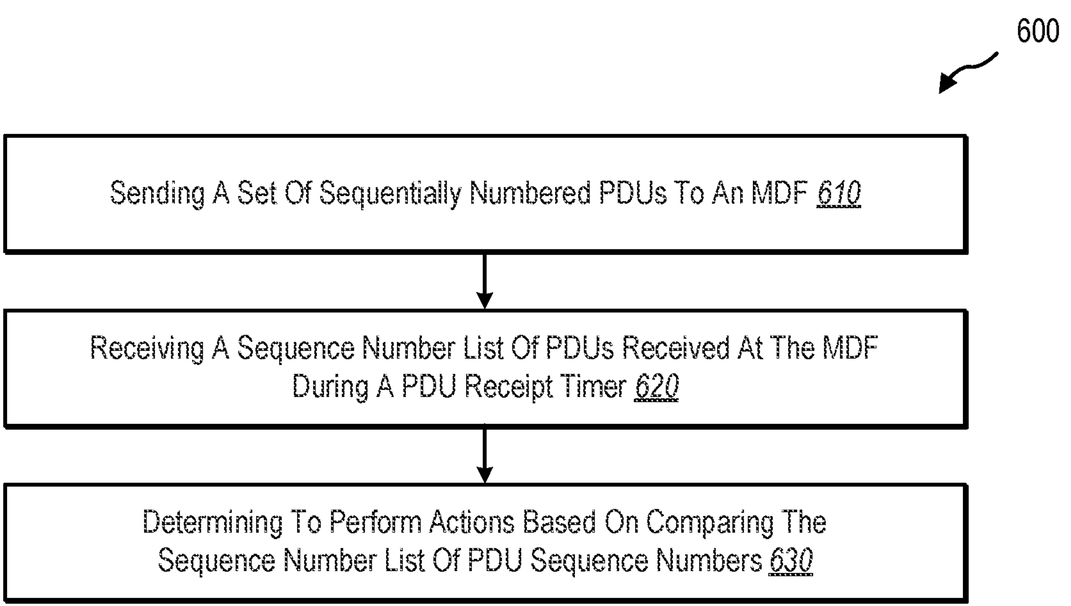
FIG. 6 illustrates another example series of acts for a computer-implemented method for improving data reliability of a lawful interception network interface within a telecommunications mobile network.

Turning now to FIG. 5 and FIG. 6, each of these figures illustrate an example flowchart that includes a series of acts for utilizing the PDU reliability system 218 in accordance with one or more implementations. In particular, both FIG. 5 and FIG. 6 illustrate an example of a computer-implemented method for improving data reliability of a lawful interception network interface within a telecommunications mobile network via n-to-n acknowledgments in accordance with one or more implementations. In various implementations, the core network includes a fifth-generation (5G) mobile core network of a telecommunications network and/or a virtualized fifth-generation (5G) mobile core network. In some implementations, the series of acts 500 includes managing lawful interception (LI) network functions in the mobile core network of a telecommunications network to improve PDU reliability and robustness.

While FIG. 5 and FIG. 6 each illustrate acts according to one or more implementations, alternative implementations may omit, add to, reorder, and/or modify any of the acts shown. Further, the acts of FIG. 5 and FIG. 6 can be performed as part of a method (e.g., a computer-implemented method). Alternatively, a non-transitory computer-readable medium can include instructions that, when executed by a processing system comprising a processor, cause a computing device to perform the acts of FIG. 5 and FIG. 6. In some implementations, a system (e.g., a processing system with a processor) performs the acts of FIG. 5 and FIG. 6.

As shown, the series of acts 500 includes an act 510 of starting a PDU receipt timer based on receiving a PDU from a POI application. For instance, in example implementations, the act 510 includes starting a protocol data unit (PDU) receipt timer having a duration (or with a specified duration) based on receiving a PDU from a point of interception application (POI application). In various implementations, the act 510 includes starting the PDU receipt timer at a mediation and delivery function (MDF) upon receiving the PDU at the MDF. In some implementations, the PDU received from the POI application includes a first sequence number within a header of the PDU.

In one or more implementations, the POI application and the MDF reside on a mobile core of a fifth-generation telecommunications mobile network. In some instances, a network function within the mobile core of the telecommunications mobile network includes the POI application and an egress gateway for sending PDUs to the MDF. In various implementations, the duration of the PDU receipt timer matches a duration of a keepalive timer associated with the POI application. In one or more implementations, the PDU received from the POI application is an X2 interface transmission that includes intercept related information (xIRI) and/or the PDU acknowledgment packet is an X2 PDU acknowledgment packet. In some instances, the PDU received from the POI application is an X3 interface transmission that includes content of communication (xCC).

As further shown, the series of acts 500 includes an act 520 of generating a sequence number list of PDU sequence numbers received from the POI application during the PDU receipt timer. For instance, in example implementations, the act 520 involves generating a sequence number list of PDU sequence numbers based on identifying PDU sequence numbers from PDUs received from the POI application during the duration of the PDU receipt timer. In some instances, the sequence number list of PDU sequence numbers omits or excludes a sequence number of a PDU sent by the POI application to the MDF during the duration of the PDU receipt timer.

As shown further, the series of acts 500 includes an act 530 of providing a PDU acknowledgment packet that includes the sequence number list. For instance, in example implementations, the act 530 involves providing, to the POI application, a PDU acknowledgment packet that includes the sequence number list of PDU sequence numbers from the PDUs received during the duration of the PDU receipt timer. In various implementations, the act 530 includes causing the POI application to compare the sequence number list of PDU sequence numbers with sequence numbers from a set of PDUs sent by the POI application. In some implementations, providing the sequence number list of PDU sequence numbers to the POI application further causes the POI application to perform one or more actions with one or more PDUs from the set of PDUs. In various implementations, the one or more actions include retransmitting a dropped PDU in the set of PDUs to the MDF, discarding the dropped PDU, flagging or logging the dropped PDU, or discarding a received PDU from a buffer.

In some implementations, the series of acts 500 includes additional acts. For example, the series of acts 500 includes an act of receiving a retransmitted version of an additional PDU from the POI application out of sequential order based on the POI application previously sending a previous version of the additional PDU in sequential order to the MDF and the previous version of the additional PDU not arriving at the MDF. In many instances, the MDF receives the retransmitted version of the additional PDU after providing the PDU acknowledgment packet to the POI application.

In some implementations, the series of acts 500 includes acts of starting an additional PDU receipt timer having the same duration after the PDU receipt timer expires; failing to receive additional PDUs from the POI application during the duration of the additional PDU receipt timer; providing the POI application with an additional PDU acknowledgment packet indicating no PDUs received during the additional PDU receipt timer; and stopping, after the additional PDU receipt timer expires, further PDU receipt timers from starting until further PDUs are received from the POI application.

In various implementations, additional PDUs received from the POI application during the duration of the PDU receipt timer are incremented starting after the first sequence number. In some instances, the MDF receives PDU messages of different PDU types such as a first PDU with a first type of X2 PDU, a second PDU with a second type of X3 PDU, a third PDU with a third type of Keepalive, and/or a fourth PDU with a fourth type of PDU acknowledgment.

As mentioned above, FIG. 6 illustrates another example series of acts for a computer-implemented method for improving data reliability of a lawful interception network interface within a telecommunications mobile network via n-to-n acknowledgments. As shown, the series of acts 600 includes an act 610 of sending a set of sequentially numbered PDUs to an MDF. For instance, in example implementations, the act 610 includes sending, from a point of interception application (POI application), a set of protocol data units (a set of PDUs) to a mediation and delivery function (MDF), wherein sent PDUs in the set of PDUs are sequentially numbered.

As further shown, the series of acts 600 includes an act 620 of receiving a sequence number list of PDUs received at the MDF during a PDU receipt timer. For instance, in example implementations, the act 620 involves receiving, after a PDU receipt timer has elapsed at the MDF, a sequence number list of PDU sequence numbers from PDUs received from the POI application during the duration of the PDU receipt timer. In some instances, the sequence number list of PDU sequence numbers omits a sequence number of a PDU sent by the POI application to the MDF during the duration of the PDU receipt timer.

As shown further, the series of acts 600 includes an act 630 of determining to perform actions based on comparing the sequence number list of PDU sequence numbers. For instance, in example implementations, the act 630 involves determining to perform one or more actions with a PDU from the set of PDUs based on comparing the sequence number list of PDU sequence numbers with sequence numbers from the set of PDUs sent to the MDF.

In some implementations, the series of acts 600 includes additional acts. For example, the series of acts 600 includes an act of determining that an additional PDU was not received by the MDF based on comparing the sequence number list of PDU sequence numbers with the sequence numbers from the set of PDUs sent to the MDF and retransmitting the additional PDU from the POI application. In alternative implementations, the series of acts 600 includes determining that an additional PDU was received by the MDF based on comparing the sequence number list of PDU sequence numbers with the sequence numbers from the set of PDUs sent to the MDF and removing the additional PDU from a buffer at the POI application.

Figure 7:
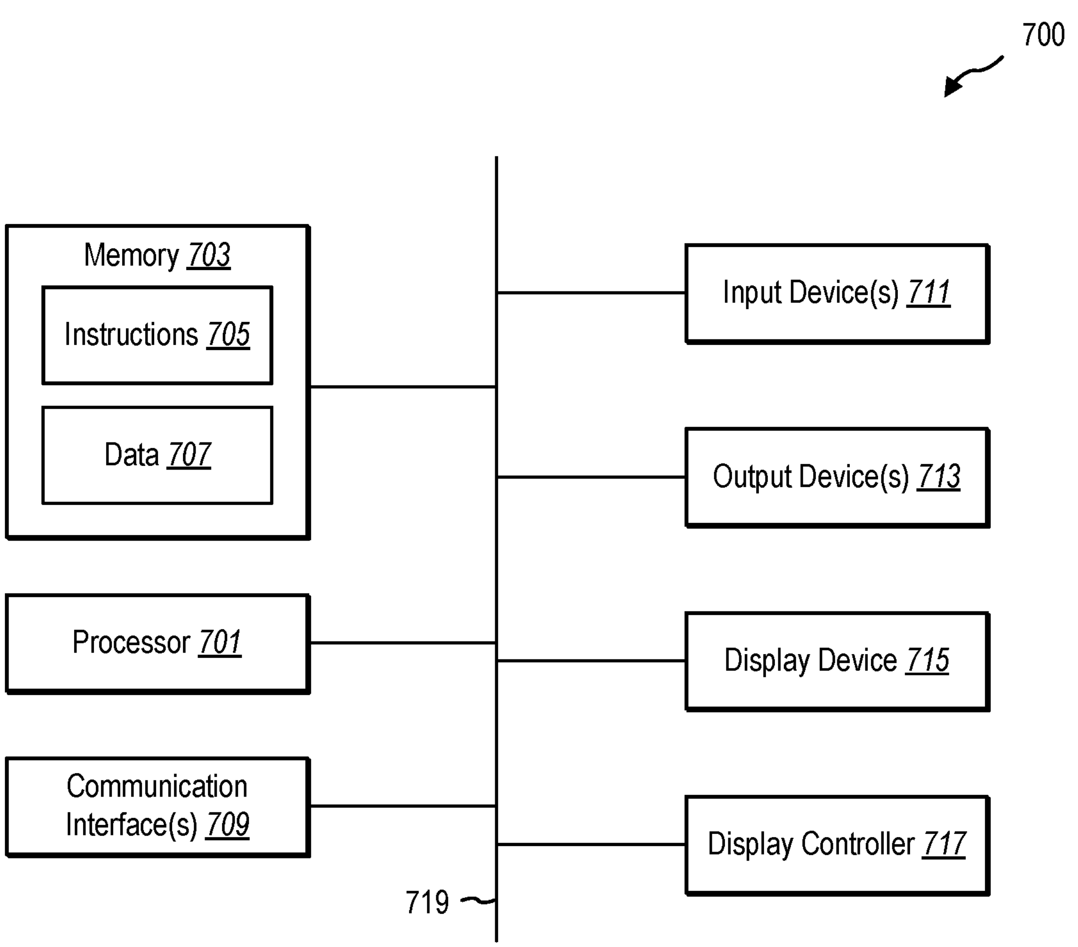
FIG. 7 illustrates certain components that may be included within a computer system for implementing the PDU reliability system.

FIG. 7 illustrates certain components that may be included within a computer system 700. The computer system 700 may be used to implement the various computing devices, components, and systems described herein. As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU). Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the PDU reliability system 218. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC) and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for improving data reliability of a lawful interception network interface within a telecommunications mobile network via n-to-n acknowledgments, comprising:

based on receiving a protocol data unit (PDU) from a point of interception (POI) application, starting a PDU receipt timer having a first duration;

generating a sequence number list of PDU sequence numbers based on identifying PDU sequence numbers from PDUs received from the POI application during the first duration of the PDU receipt timer; and providing, to the POI application, a PDU acknowledgment packet that includes the sequence number list of PDU sequence numbers from the PDUs received during the first duration of the PDU receipt timer.

2. The computer-implemented method of claim 1, further comprising starting the PDU receipt timer at a mediation and delivery function (MDF) upon receiving the PDU at the MDF.

3. The computer-implemented method of claim 2, wherein the POI application and the MDF reside on a mobile core of a fifth-generation (5G) telecommunications mobile network.

4. The computer-implemented method of claim 3, wherein a network function within the mobile core of the telecommunications mobile network includes the POI application and an egress gateway for sending PDUs to the MDF.

5. The computer-implemented method of claim 2, wherein the sequence number list of PDU sequence numbers omits a sequence number of a PDU sent by the POI application to the MDF during the first duration of the PDU receipt timer.

6. The computer-implemented method of claim 5, wherein providing the sequence number list of PDU sequence numbers to the POI application causes the POI application to compare the sequence number list of PDU sequence numbers with sequence numbers from a set of PDUs sent by the POI application.

7. The computer-implemented method of claim 6, wherein providing the sequence number list of PDU sequence numbers to the POI application further causes the POI application to perform one or more actions with one or more PDUs from the set of PDUs.

8. The computer-implemented method of claim 6, further comprising:

receiving a retransmitted version of an additional PDU from the POI application out of sequential order based on the POI application previously sending a previous version of the additional PDU in sequential order to the MDF and the previous version of the additional PDU not arriving at the MDF, wherein the MDF receives the retransmitted version of the additional PDU after providing the PDU acknowledgment packet to the POI application.

9. The computer-implemented method of claim 7, wherein the one or more actions include:

retransmitting a dropped PDU in the set of PDUs to the MDF;

discarding the dropped PDU;

flagging or logging the dropped PDU; or discarding a received PDU from a buffer.

10. The computer-implemented method of claim 1, wherein:

the PDU received from the POI application is an X2 interface transmission that includes intercept related information (xIRI); and the PDU acknowledgment packet is an X2 PDU acknowledgment packet.

11. The computer-implemented method of claim 1, wherein the PDU received from the POI application is an X3 interface transmission that includes content of communication (xCC).

12. The computer-implemented method of claim 1, further comprising:

starting an additional PDU receipt timer having the first duration after the PDU receipt timer expires;

failing to receive additional PDUs from the POI application during the additional PDU receipt timer;

providing the POI application with an additional PDU acknowledgment packet indicating no PDUs received during the additional PDU receipt timer; and stopping, after the additional PDU receipt timer expires, further PDU receipt timers from starting until further PDUs are received from the POI application.

13. The computer-implemented method of claim 1, wherein the first duration of the PDU receipt timer matches a second duration of a keepalive timer associated with the POI application.

14. In a 5G telecommunications mobile network, a system for improving data reliability of a lawful interception network interface via n-to-n acknowledgments, comprising:

a processing system comprising a processor; and a computer memory comprising instructions that, when executed by the processing system, cause the system to perform operations comprising:

based on receiving a protocol data unit (PDU) from a point of interception (POI) application, starting a PDU receipt timer having a first duration;

generating a sequence number list of PDU sequence numbers based on identifying PDU sequence numbers from PDUs received from the POI application during the first duration of the PDU receipt timer; and providing, to the POI application, a PDU acknowledgment packet that includes the sequence number list of PDU sequence numbers from the PDUs received during the first duration of the PDU receipt timer.

15. The system of claim 14, wherein the PDU received from the POI application includes a first sequence number within a header of the PDU.

16. The system of claim 15 wherein additional PDUs received from the POI application during the first duration of the PDU receipt timer are incremented starting after the first sequence number.

17. The system of claim 14, further comprising receiving:

a first PDU with a first type of X2 PDU;

a second PDU with a second type of X3 PDU;

a third PDU with a third type of Keepalive; and a fourth PDU with a fourth type of PDU acknowledgment.

18. A computer-implemented method for improving data reliability of a lawful interception network interface within a telecommunications mobile network via n-to-n acknowledgments, comprising:

based on receiving a protocol data unit (PDU) from a point of interception (POI) application, starting a PDU receipt timer having a first duration;

generating a sequence number list of PDU sequence numbers based on identifying PDU sequence numbers from PDUs received from the POI application during the first duration of the PDU receipt timer; and providing, to the POI application, a PDU acknowledgment packet that includes the sequence number list of PDU sequence numbers from the PDUs received during the first duration of the PDU receipt timer, wherein providing the PDU acknowledgement packet including the sequence number list of PDU sequence numbers to the POI application further causes the POI application to perform one or more actions with one or more PDUs from the set of PDUs.

19. The computer-implemented method of claim 18, wherein the one or more actions include:

retransmitting a dropped PDU in the set of PDUs to the MDF;

discarding the dropped PDU;

flagging or logging the dropped PDU; or discarding a received PDU from a buffer.

20. The computer-implemented method of claim 18, further comprising starting the PDU receipt timer at a mediation and delivery function (MDF) upon receiving the PDU at the MDF.

* * * * *